US009312707B2

(12) United States Patent
Stewart et al.

(10) Patent No.: US 9,312,707 B2
(45) Date of Patent: Apr. 12, 2016

(54) PORTABLE COMPACT MULTIPLE-OUTLET POWER SUPPLY WITH CIRCUIT FOR SUPPLYING DEVICE-SPECIFIC CHARGING PROFILES TO MOBILE TELEPHONES

(71) Applicants: Brian Stewart, Indianapolis, IN (US); Scott Weaver, Indianapolis, IN (US)

(72) Inventors: Brian Stewart, Indianapolis, IN (US); Scott Weaver, Indianapolis, IN (US)

(73) Assignee: S P TECHNOLOGIES LLC, Indianapolis, IN (US)

( * ) Notice: Subject to any disclaimer, the term of this patent is extended or adjusted under 35 U.S.C. 154(b) by 384 days.

(21) Appl. No.: 13/891,817

(22) Filed: May 10, 2013

(65) Prior Publication Data

US 2014/0333263 A1    Nov. 13, 2014

(51) Int. Cl.
*H02J 7/00* (2006.01)

(52) U.S. Cl.
CPC .............. *H02J 7/0042* (2013.01); *H02J 7/0054* (2013.01); *H02J 7/0063* (2013.01); *H02J 7/0027* (2013.01); *H02J 2007/0062* (2013.01); *Y10T 307/25* (2015.04); *Y10T 307/336* (2015.04)

(58) Field of Classification Search
CPC  Y10T 307/25; Y10T 307/336; H01R 31/065; H01R 31/02; H01R 25/003; H01R 25/006; H01R 27/02; H01J 7/0027
USPC ......................................................... 320/111
See application file for complete search history.

(56) References Cited

U.S. PATENT DOCUMENTS

| | | | |
|---|---|---|---|
| 6,923,684 B2 | 8/2005 | Strayer | |
| 7,890,783 B2 * | 2/2011 | Tupman | G06F 1/266 710/14 |
| 8,197,260 B2 | 6/2012 | Wadsworth | |
| 8,575,785 B2 | 11/2013 | Perper et al. | |
| 2003/0128507 A1 * | 7/2003 | Metcalf | 361/686 |
| 2006/0277335 A1 | 12/2006 | Chien | |
| 2007/0275594 A1 | 11/2007 | Greenberg | |
| 2007/0285053 A1 * | 12/2007 | Noguchi | H02J 7/32 320/114 |
| 2008/0012423 A1 | 1/2008 | Mimran | |
| 2010/0213892 A1 * | 8/2010 | DeSanctis | 320/107 |
| 2011/0256775 A1 | 10/2011 | Su | |
| 2012/0003854 A1 * | 1/2012 | He | 439/188 |
| 2012/0229090 A1 * | 9/2012 | Arai et al. | 320/111 |
| 2012/0258629 A1 | 10/2012 | Kemp | |
| 2014/0239886 A1 * | 8/2014 | Lalitnuntikul | H02J 7/0052 320/107 |
| 2014/0312691 A1 * | 10/2014 | Doljack | H02J 7/00036 307/29 |
| 2015/0001937 A1 * | 1/2015 | Wang | H01R 13/70 307/52 |
| 2015/0280475 A1 * | 10/2015 | Li | H02J 7/007 320/107 |

OTHER PUBLICATIONS

Europe 2P to USA 2P Plug Adapter, Retrieved from the Internet: https://www.archive.org/web/20130213154259/http://www.sfcable.com/YL1122.html? Published Feb. 13, 2013. Downloaded from Internet archive Feb. 8, 2015. Second page.

* cited by examiner

*Primary Examiner* — Yalkew Fantu
*Assistant Examiner* — Manuel Hernandez
(74) *Attorney, Agent, or Firm* — C. John Brannon; Brannon Sowers & Cracraft PC

(57) ABSTRACT

An apparatus for providing electrical power, including an electrically non-conductive generally cube-shaped housing, an electrical power supply operationally connected and positioned in the housing, a first plurality of power outlets electrically connected to power supply for connecting three-prong plugs, a second plurality of power outlets for connecting male USB connectors, and a power cord operationally connected to the power.

3 Claims, 8 Drawing Sheets

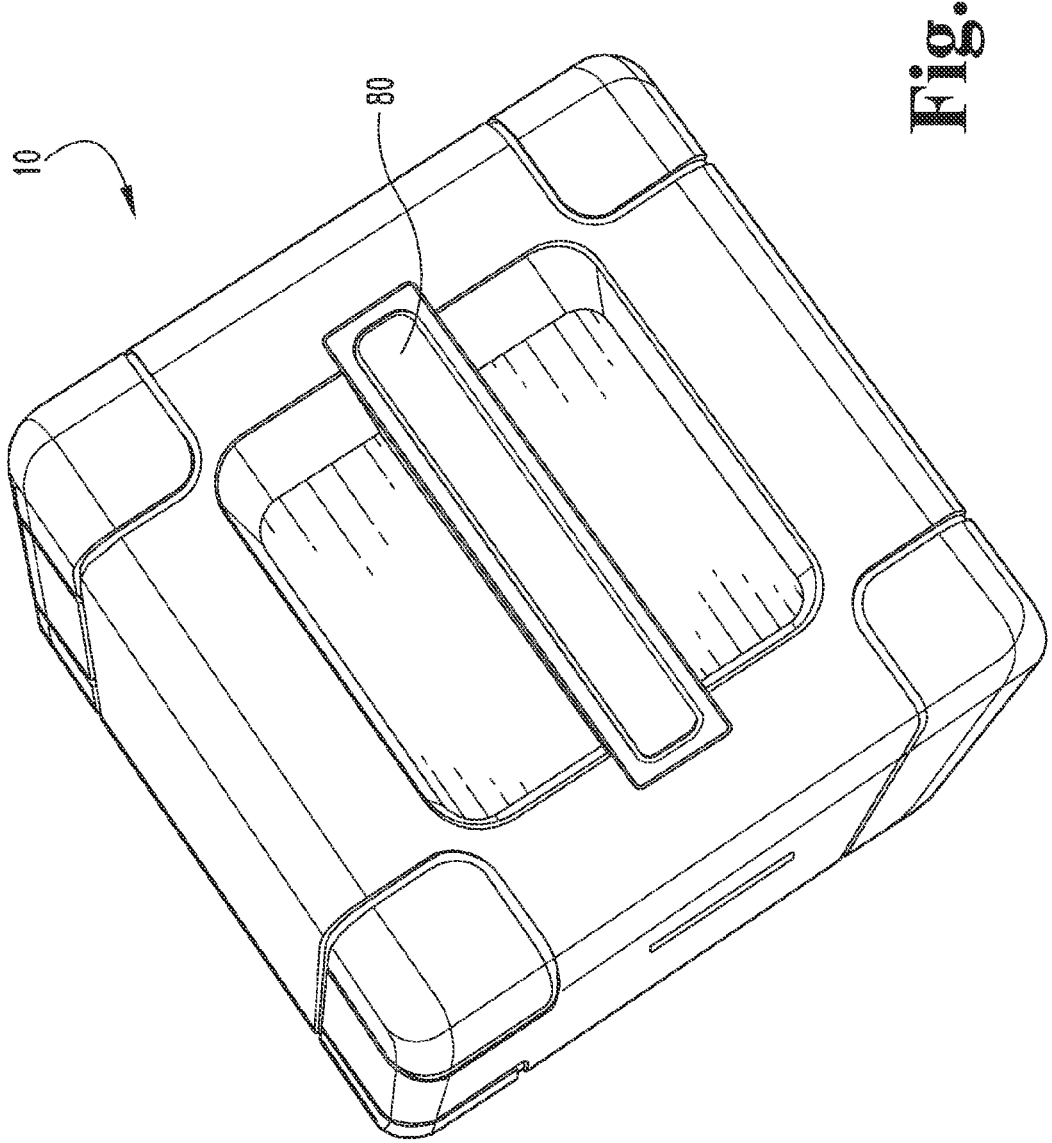

PORTABLE COMPACT MULTIPLE-OUTLET POWER SUPPLY WITH CIRCUIT FOR SUPPLYING DEVICE-SPECIFIC CHARGING PROFILES TO MOBILE TELEPHONES

TECHNICAL FIELD

The present novel technology relates generally to the field of electrical devices, and, more particularly, to a desktop power supply and charging station.

BACKGROUND

In a hyper-connected world, technology and portable electronic devices continue to change the way we work, play, and communicate. The internet has evolved from being a "nice-to-have" luxury to a channel for growth and innovation that transcends almost every facet of life; everyone and everything simply is online, whether at school, at the office, or on-the-go. A market-research company has stated that the average U.S. internet household now has 5.7 internet-connected devices, and the number of electronic devices around the globe is expected to hit anywhere from fifty billion to a staggering one trillion in the next five years. As the facts allude, most individuals today now own more than one portable electronic device, whether it be a cell phone, mp3 player, tablet, or laptop.

Portable electronic devices typically depend upon batteries as a power source, and most devices are rechargeable through an AC (alternating current) power cord, or a USB (universal serial bus) interface. The range of portable electronic devices on the market is diverse, and the AC power cords or USB power cords that permit recharging of said devices are rarely transitional amongst the varying devices. It is not atypical for an individual to charge multiple portable electronic devices at once, with multiple power cords. With various ways, and cords, to power portable electronic devices, multiple AC power receptacles or USB ports are needed to charge several devices at once. Often times, power outlets are scarce or are inconveniently placed out of reach from a desk or table-like structure where most electronics are placed or used.

While a variety of power strips that turn one AC wall receptacle into several are known, there is currently a need for a portable electronic device that solves several issues unaddressed by the traditional power strip. Power strips are often bulky in their traditionally elongated rectangular form, making portability inconvenient. Further, the use of a power strip typically requires one to reach down to the floor to find an available plug or power source, and often times individuals must rest their portable electronic devices on or near the floor due to the traditionally short AC power cords needed to power a portable electronic device. Similarly, the use of a USB outlet to power a portable electronic device typically requires a personal computer to act as the host controller; personal computers are often located underneath a desk or on the floor, and also tend to have short power cords.

Currently, individuals are not able to charge multiple portable electronic devices at once through a device that is located on a desk or tabletop, nor are they typically able to use the devices as the batteries recharge due to the location of AC power wall outlets and traditional power strips.

There is a need for an improved electronic power supply and charging device that can provide power to multiple AC powered devices, and multiple USB powered devices at once, without the "on the floor" cord dilemma. The present novel technology addresses this need.

BRIEF DESCRIPTION OF THE DRAWINGS

FIG. 8 is a top plan view of FIG. 6, illustrating a fourth embodiment electronic charging device.

DESCRIPTION OF THE PREFERRED EMBODIMENTS

Figure 1:
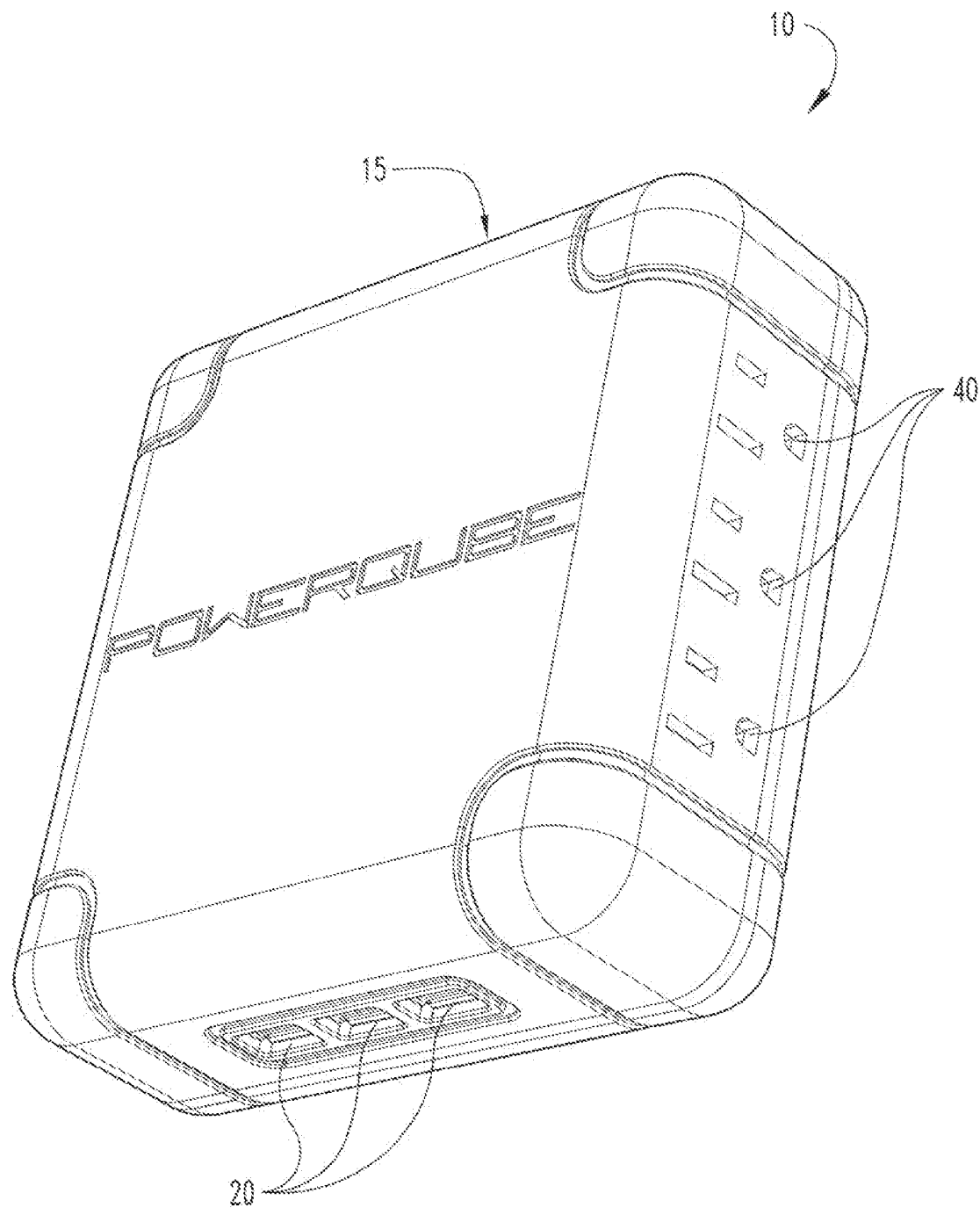
FIG. 1 is a front perspective view of an electronic charging device according to a first embodiment of the present novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

FIGS. 1-4 illustrate a first embodiment of the present novel technology, a generally cube-shaped electronic power supply and charging device 10 for providing power to other electrical devices having standard two or three-pronged plugs as well as to USB devices. The electronic charging device 10 includes a housing 1≡which is customarily defined by a base portion 16 and engageable cover portion 17. The housing 15 is typically made of hard, electrically non-conducting plastic or the like, although any convenient material may be selected. The housing 15 encases a custom power supply 18 that is operationally connected to a likewise encased custom power conversion board 19 for providing power to a plurality (typically three) of three-pronged electrical outlets 40 positioned on one or more cube faces and to a plurality (typically three) of USB ports 20 positioned on one or more cube faces. The electronic charging device 10 is typically compact, more typically measuring about 4.5 inches by about 2.75 inches, such that the device 15 is portable; for example, the device can easily fit into a backpack, travel bag, briefcase, or the like for travel. Alternatively, the electronic charging device 10 may embody varying sizes.

The electronic charging device 10 typically includes an AC power cord 55 extending from the housing 15 for connecting the custom power supply 18 in electric communication with a primary single-phase AC power supply in a home or office through a standard three-prong male AC plug 29 located at the distal end thereof. In some embodiments, the AC power cord 55 is connected in electric communication with the custom power supply 18, while in other embodiments the AC power cord 55 terminates in an electrical connector that is attachable to an electrical connector positioned in the housing 15 and connected in electric communication with the custom power supply 18. The AC power cord may be extendable and retractable, so as to be stored within the housing 15 when not in use. When engaged with an AC power outlet, the AC power cord 55 provides standard household electrical power to the custom power supply 18, typically ranging between 110 and 240 volts, alternating current with a frequency between 50 and 60 Hz. In some embodiments, the custom power supply 18 has a mode allowing for a quick charge with increased input and output, providing for a total power of 20 W.

The system includes over voltage protection, short circuit protection, and over current protection to prevent electrical surges; with increased protection for the quick charge embodiment. Further, the custom power supply 18 provides for automatic recovery after a short-circuit fault is removed and automatic shutdown when over voltage protection is activated.

The electronic charging device 10 includes a plurality of three-pronged receptacles 30 disposed in the housing 15, each receptacle 30 operationally connected to a respective connector outlet or port 40 positioned on one or more sides of the cover 17.

The electrical outlets 40 are connected in electric communication with the power supply 18 and receive AC power of the same voltage and frequency as supplied by to the AC power cord 55.

The custom power supply 18 further functions as a transformer and rectifier, for converting AC input to lower voltage DC output. The custom conversion board 19 is operationally connected to the custom power supply 18 to receive transformed and rectified DC power, typically 5 Volts and 2.5 Amps. When in the quick charge mode discussed above, the custom conversion board 19 is operationally connected to the custom power supply 18 to receive transformed and rectified DC power, typically 5 Volts and 4 Amps.

Figure 6:
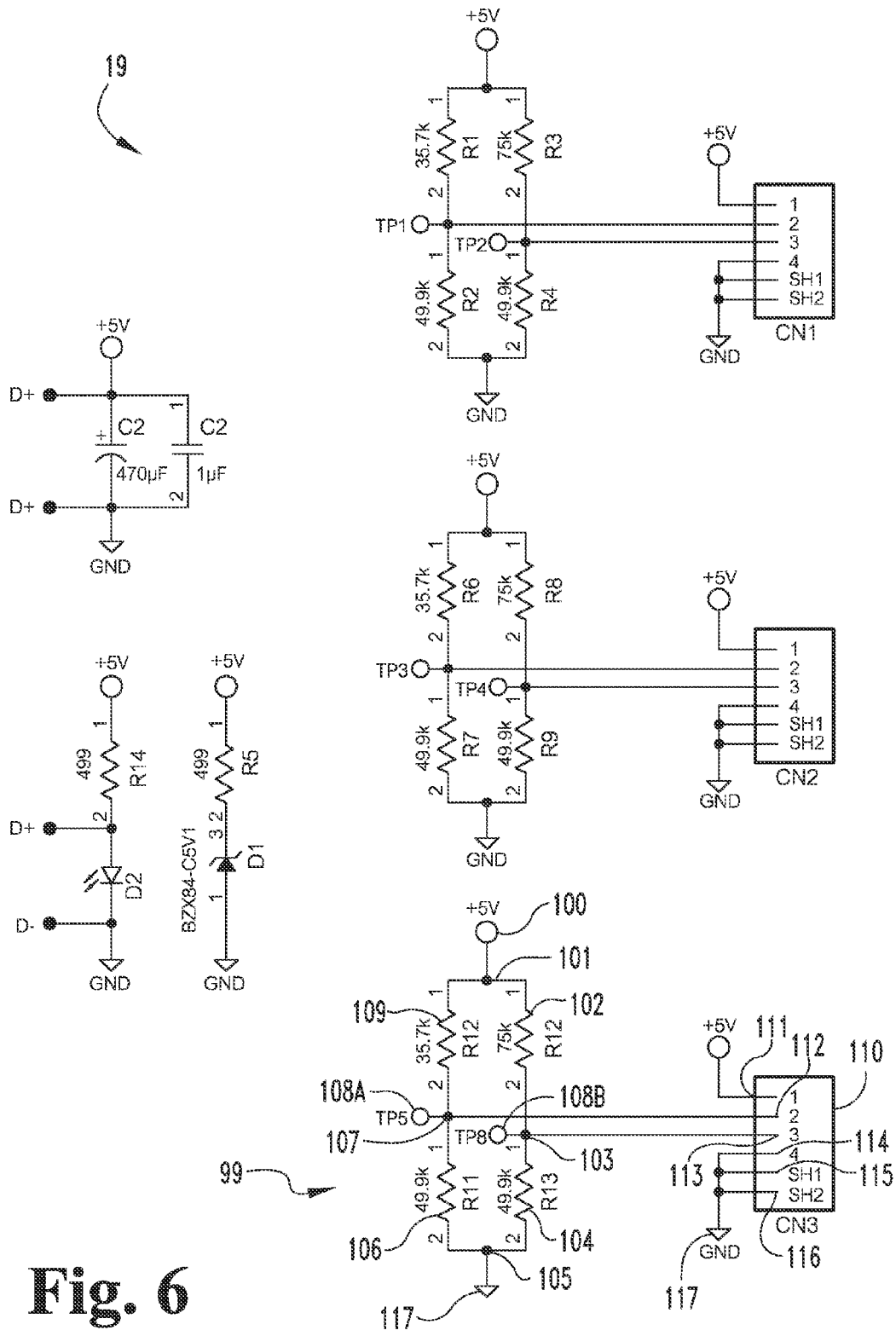
FIG. 6 is a custom power conversion board.

The custom conversion board 19 is illustrated in greater detail in FIG. 6. The board 19 contains one or more USB power supply circuits 99. Each circuit 99 includes a voltage source 100 electrically connected to first node 101. The voltage source 100 is typically the transformed and rectified 5V DC output from the power supply 18. First resistor 102 is electrically connected between first node 101 and second node 103. Second resistor 104 is electrically connected between second node 103 and third node 105. Third resistor 106 is electrically connected between third node 105 and fourth node 107. First test point (TP) 108A is electrically connected to Fourth node 107. Fourth resistor 109 is electrically connected between first node 101 and fourth node 107. Second test point 108B is electrically connected to second node 103. USB connector 110 includes six pins 111-116, with first pin 111 electrically connected to the voltage source 100, second pin 112 electrically connected to fourth node 109, third pin 113 electrically connected to second node 103, and fourth, fifth and sixth pins 114-116 electrically connected to ground 117, as is third node 105. A USB male connector is engagable with chip 110 to receive power therefrom.

In one embodiment, the first resistor 102 has a resistance of about 75K Ohms, the second resistor 104 has a resistance of about 50K Ohms, the third resistor 106 has a resistance of about 50K Ohms, and the fourth resistor 109 has a resistance of about 38K Ohms.

In operation, the electronic charging device 10 provides for a plurality (typically three) of USB ports 20 positioned on one or more housing 15 faces for supplying DC power to USB devices. A USB male connector is engaged with a port 20 and is subsequently supplied with (typically) 5V DC power. Likewise, a standard 2-prong or 3-prong plug may be engaged with a port 40 to receive (typically) 110V AC power. In some embodiments, the custom power supply may include transformer functionality to step the input voltage up or down, for instance providing an AC output voltage from 110V or 220V or higher, and a DC output voltage from 1.5V, 2.5V, or 4.0V or the like, to accommodate the voltage requirements of different devices and/or regionally common line voltages and frequencies.

Figure 7:
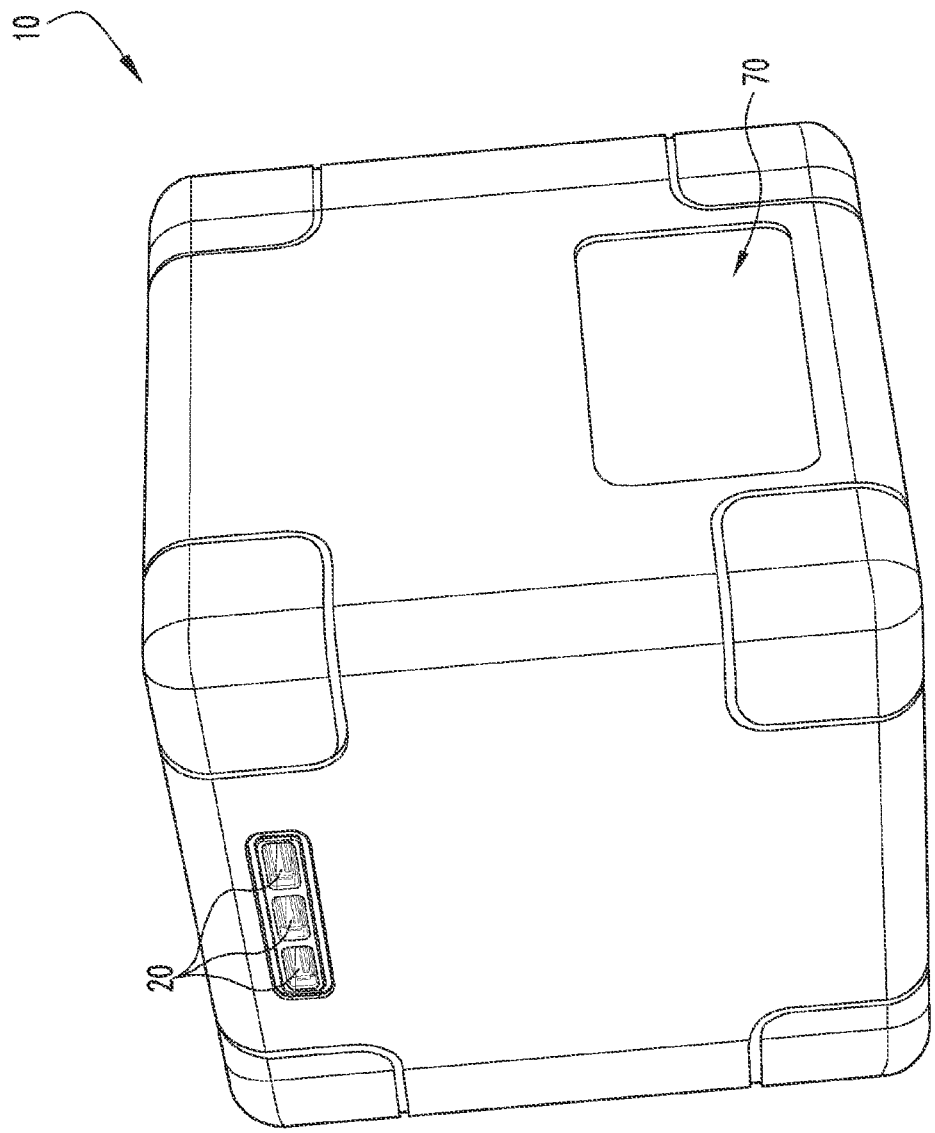
FIG. 7 is a front perspective view of a fourth embodiment electronic charging device.

In another embodiment, the electronic charging device 10 operates as described above, however, the location of the connection for the standard two or three-prong AC power cord is not directly on the device 10 itself. As shown in FIG. 7, opposite the AC power cord 55 is an aperture 70 that houses an extension cord (not shown) that extends from the electronic charging device 10 to provide power to more remote devices. The extension cord (not shown) provides for a plurality of AC receptacles (not shown) to allow multiple devices to be plugged into the electronic charging device 10 simultaneously. A plurality (typically three) USB ports 20 remain on one or more housing faces. This embodiment further provides a handle 80, typically made of hard electrically non-conducting plastic or the like, although any convenient composition may be selected, that is located on the top plan view of the embodiment, as illustrated in FIG. 8. The handle 80 may be recessed when not in use and extendable for use, or may be formed having a fixed position.

Figure 2:
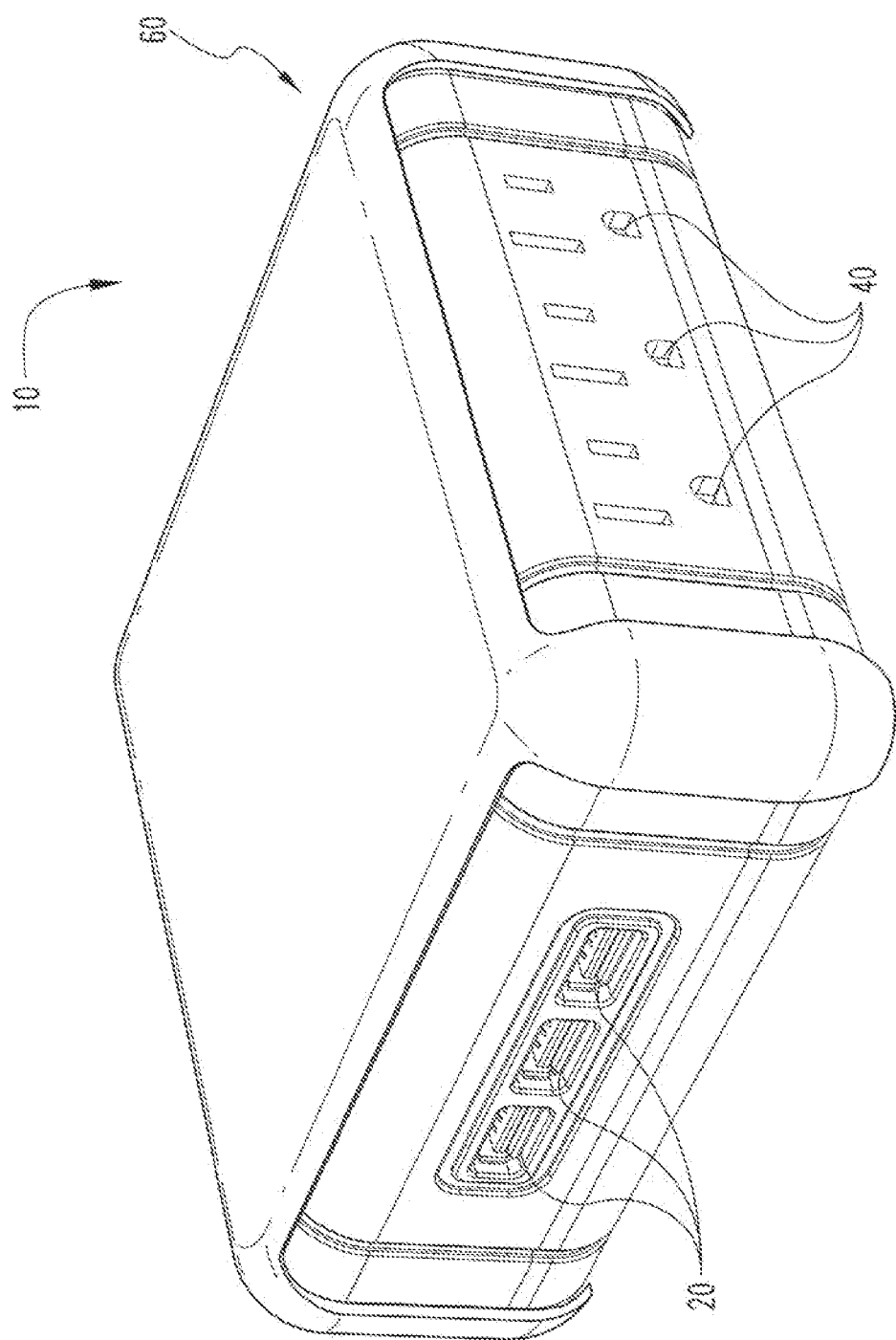
FIG. 2 is a front perspective view of a third embodiment illustrating a removable plastic cover.
Figure 3:
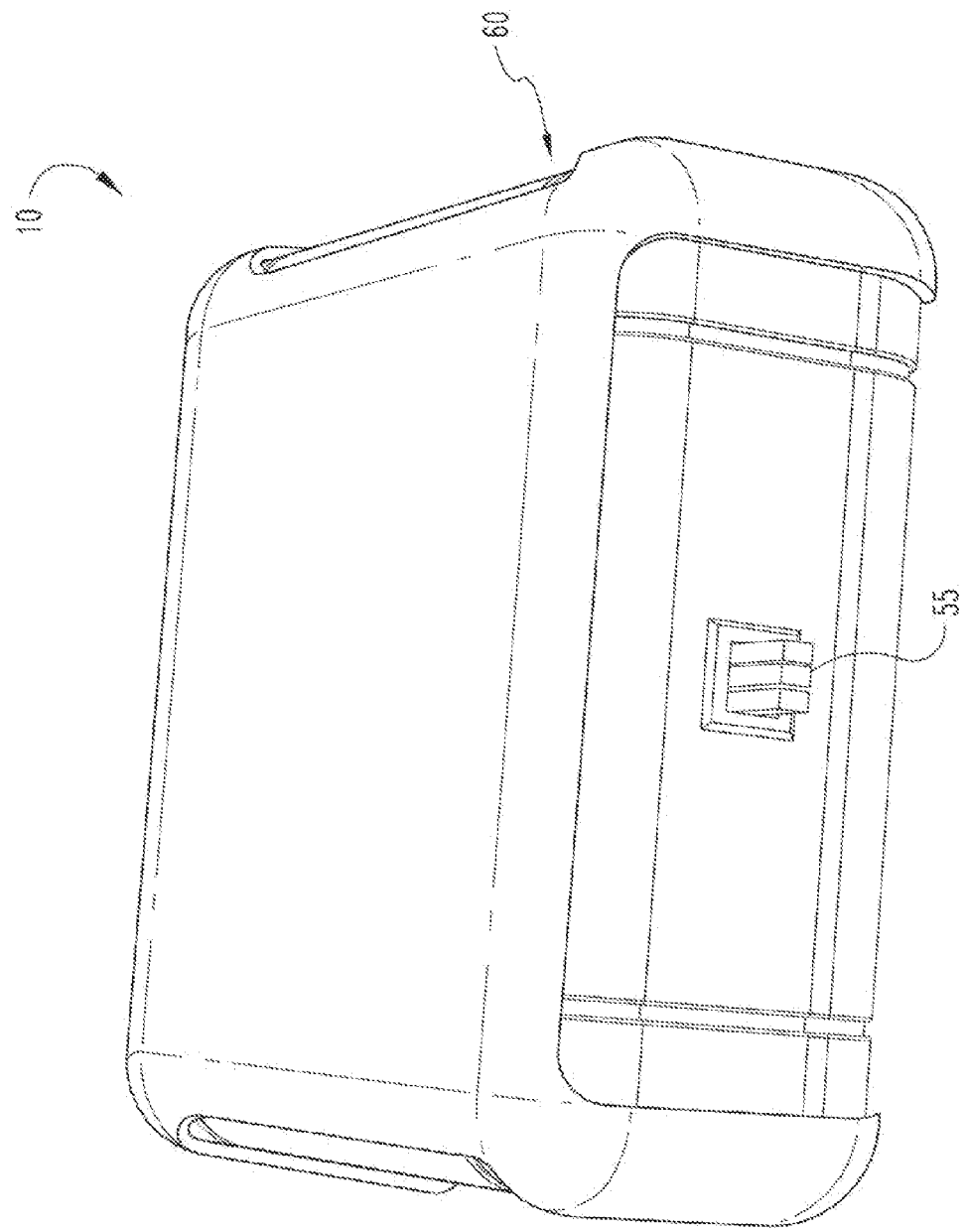
FIG. 3 is a rear plan view of a second embodiment electronic charging device illustrating an attached AC plug and a third embodiment of the present novel technology illustrating a removable plastic cover.
Figure 4:
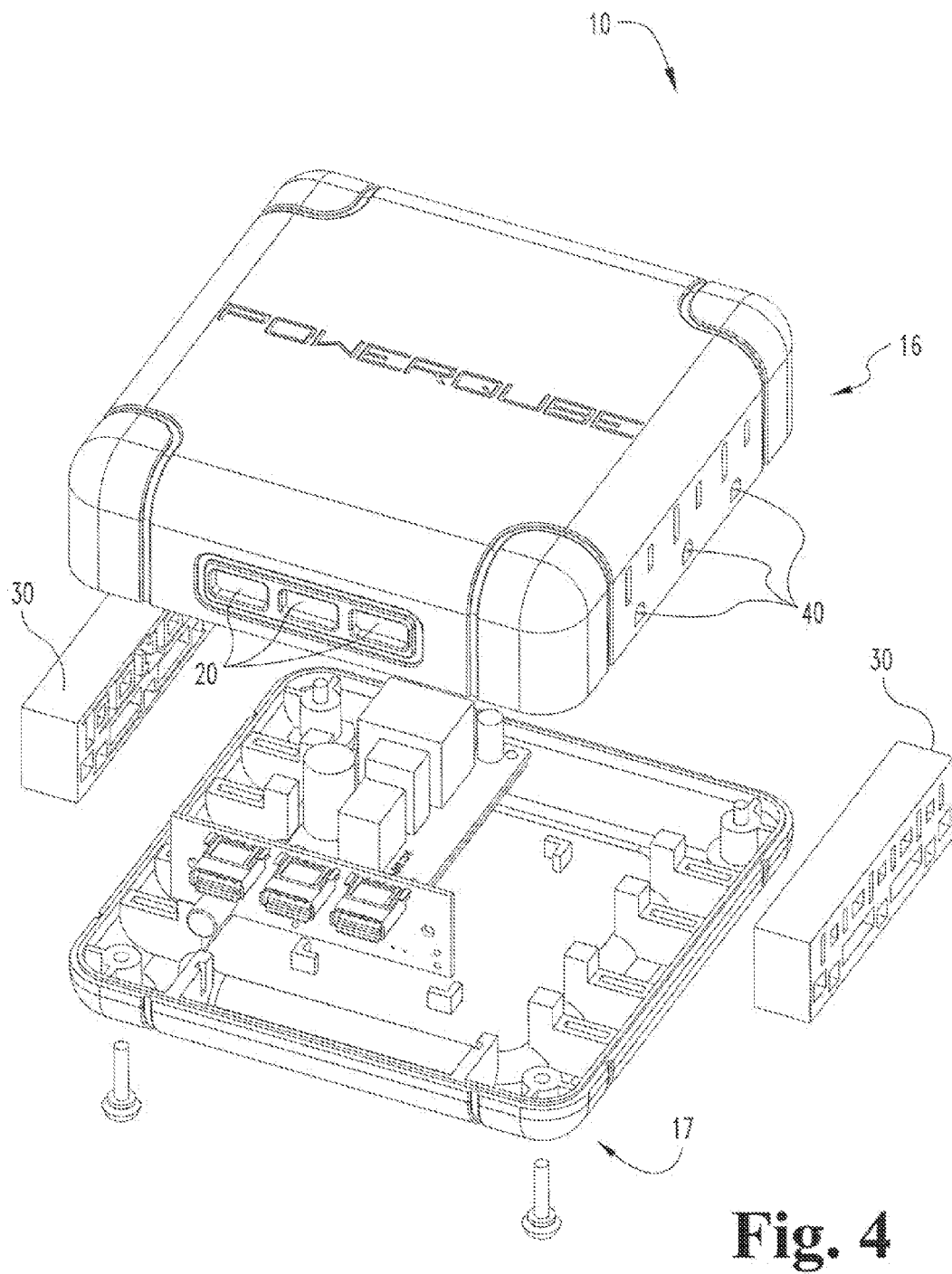
FIG. 4 is an exploded view of the embodiment of FIG. 1 is a front perspective view of a third embodiment illustrating a removable plastic cover.
Figure 5:
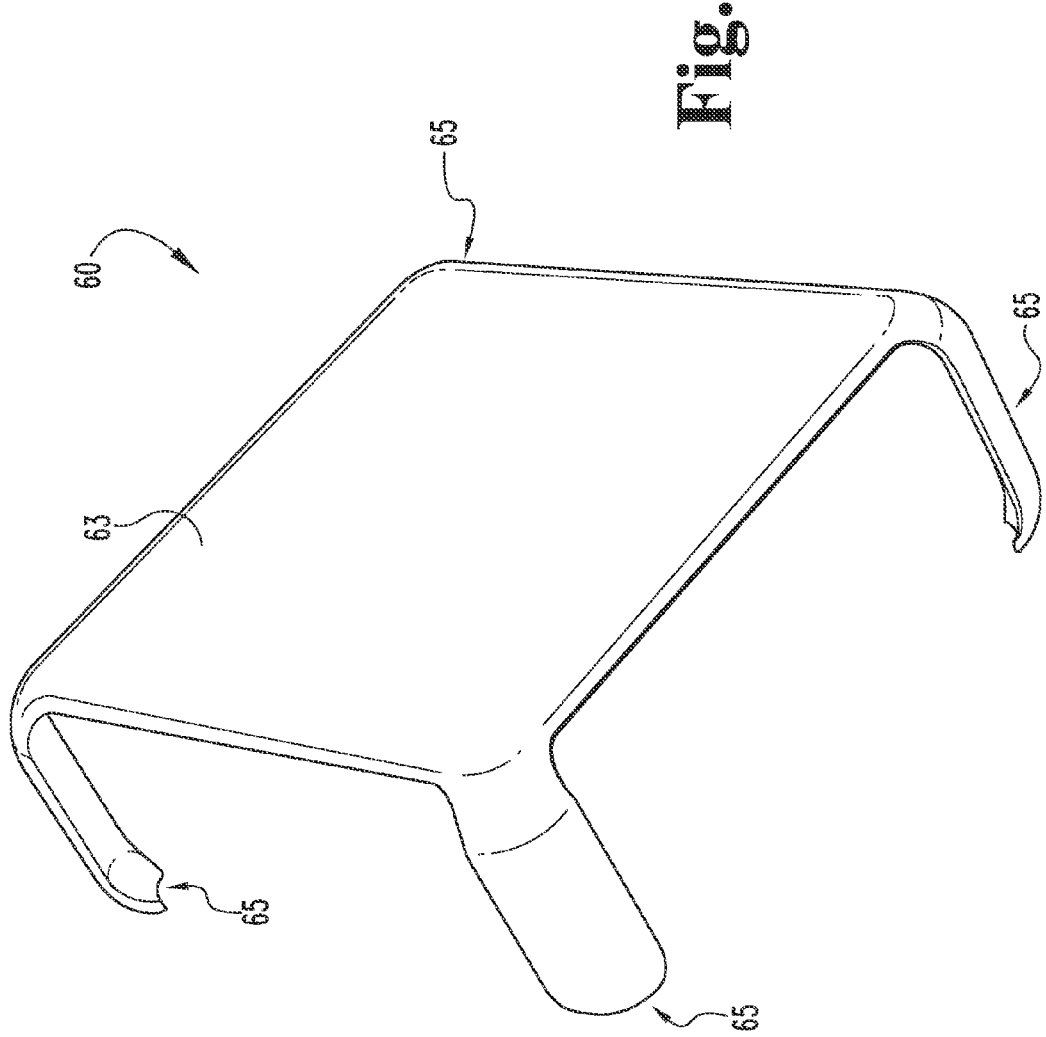
FIG. 5 is a front perspective view of a third embodiment illustrating a removable plastic cover.

As seen in FIGS. 2-3 and FIG. 5, a removable cover 60 may be engaged to protect and compliment the device 10. The cover 60 typically includes surface ornamentation. The removable cover 60 is typically made of semi-pliable electrically non-conducting plastic or the like, although any convenient composition may be selected. The cover 60 typically features a generally elongated top surface that snugly fits the dimensions of the present novel technology. The removable cover 60 includes a generally rectangular flat portion 63 and four leg members 65 extending perpendicularly or downwardly from each of the respective four corners to securely connect the cover to the top of the electronic charging device 10 as illustrated in FIGS. 2-3 and 5. The leg members 65 typically engage the sides of the device housing 15 in a snug interference fit.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A device for conveniently charging multiple electronic devices atop a table or countertop, comprising in combination:
    a generally cube-shaped electrically non-conducting housing;
    a power supply, wherein the power supply functions as an AC step transformer and as a rectifier to supply a DC voltage;

a circuit board electrically connected to the power supply;
at least one USB circuit operationally connected to the circuit board;
at least one USB outlet, wherein each respective at least one USB outlet is electrically connected to a respective at least one USB circuit;
a plurality of three-prong power outlets electrically connected to the power supply;
wherein the at least one USB circuit further comprises:
   a voltage source;
   a first node electrically connected to the voltage source;
   a second node;
   a first resistor electrically connected to the first node and to the second node;
   a third node electrically connected to ground;
   a second resistor electrically connected to the second node and to the third node;
   a fourth node;
   a third resistor electrically connected to the third node and to the fourth node;
   a first test point electrically connected to the fourth node;
   a fourth resistor electrically connected to the first node and to the fourth node;
   a second test point electrically connected to the second node;
   a USB connector defining the at least one USB outlet and having a first pin, a second pin, a third pin, a fourth pin, a fifth pin and a sixth pin;
   wherein the first pin is electrically connected to the voltage source;
   wherein the second pin is electrically connected to the fourth node;
   wherein the third pin is electrically connected to the second node;
   wherein the fourth, the fifth and the sixth pins are electrically connected to ground;
   wherein the voltage source is a 5V DC output from the power supply; and
   wherein a USB male connector is engagable with the at least one USB outlet to receive power therefrom.

2. An apparatus for providing electrical power, the apparatus comprising:
   an electrically non-conductive generally cube-shaped housing consisting of a base and cover;
   an electrical power supply operationally connected and positioned in the housing;
   a circuit board positioned within the housing and connected to the power supply;
   a first plurality of power outlets electrically connected to the power supply for connecting three-prong plugs;
   a second plurality of power outlets for connecting male USB connectors;
   a power cord operationally connected to the power supply and containing a distal end for engaging a wall outlet to conduct electricity to the power supply and supplies DC power to second plurality of power outlets;
   wherein the power cord has a proximal end and wherein the power supply has a connector for receiving the proximal end in electric communication;
   wherein the generally cube-shaped housing consisting of a base and cover is around 4.5 inches by about 2.75 inches;
   wherein the power supply functions as a transformer and rectifier for converting AC input to lower voltage DC output;
   wherein the circuit board is operationally connected to the power supply to receive transformed and rectified power;
   wherein the circuit board further comprises at least one USB power circuit; and
   wherein the at least one USB power circuit further comprises:
      a voltage source;
      a first node electrically connected to the voltage source;
      a second node;
      a first resistor electrically connected to the first node and to the second node;
      a third node electrically connected to ground;
      a second resistor electrically connected to the second node and to the third node;
      a fourth node;
      a third resistor electrically connected to the third node and to the fourth node;
      a first test point electrically connected to fourth node;
      a fourth resistor electrically connected to the first node and to the fourth node;
      a second test point electrically connected to the second node;
      a USB connector having a first pin, a second pin, a third pin, a fourth pin, a fifth pin and a sixth pin;
      wherein the first pin is electrically connected to the voltage source;
      wherein the second pin is electrically connected to the fourth node;
      wherein the third pin is electrically connected to the second node;
      wherein the fourth, the fifth and the sixth pins are electrically connected to ground;
      wherein the voltage source is a 5V DC output from the power supply; and
      wherein USB male connectors are engagable with the USB connector to receive power therefrom.

3. The device of claim 2, wherein the first resistor has a resistance of about 75K Ohms; wherein the second resistor has a resistance of about 50K Ohms; wherein the third resistor has a resistance of about 50K Ohms; and wherein the fourth resistor has a resistance of about 38K Ohms.

* * * * *